(12) United States Patent
Furuyoshi

(10) Patent No.: US 11,453,432 B2
(45) Date of Patent: Sep. 27, 2022

(54) TURNING DEVICE

(71) Applicant: JTEKT CORPORATION, Osaka (JP)

(72) Inventor: Masakazu Furuyoshi, Kitakatsuragi-gun (JP)

(73) Assignee: JTEKT CORPORATION, Aichi-ken (JP)

( * ) Notice: Subject to any disclaimer, the term of this patent is extended or adjusted under 35 U.S.C. 154(b) by 235 days.

(21) Appl. No.: 17/026,580

(22) Filed: Sep. 21, 2020

(65) Prior Publication Data

US 2021/0086822 A1 Mar. 25, 2021

(30) Foreign Application Priority Data

Sep. 24, 2019 (JP) .............................. JP2019-173094

(51) Int. Cl.
*B62D 5/04* (2006.01)
*B62D 7/22* (2006.01)
*B62D 15/02* (2006.01)

(52) U.S. Cl.
CPC ........... *B62D 5/0418* (2013.01); *B62D 5/046* (2013.01); *B62D 7/226* (2013.01); *B62D 15/0225* (2013.01)

(58) Field of Classification Search
CPC .... B62D 5/043; B62D 15/0225; B62D 7/226; B62D 5/0418
See application file for complete search history.

(56) References Cited

U.S. PATENT DOCUMENTS

| | | | | |
|---|---|---|---|---|
| 11,139,679 | B2 * | 10/2021 | Sato | ........................ G01R 31/40 |
| 2007/0123381 | A1 | 5/2007 | Scharfenberg | |
| 2018/0093707 | A1 | 4/2018 | Tokioka et al. | |
| 2021/0086821 | A1 * | 3/2021 | Furuyoshi | ............. F16H 49/001 |
| 2021/0086827 | A1 * | 3/2021 | Kuehnhoefer | ....... B62D 5/0484 |
| 2021/0323604 | A1 * | 10/2021 | Combs | ................. B62D 5/0403 |

FOREIGN PATENT DOCUMENTS

| | | | | |
|---|---|---|---|---|
| CN | 110371189 A | * | 10/2019 | |
| DE | 102004023341 A1 | * | 12/2005 | ........... B60K 7/0007 |
| DE | 202005020621 U1 | | 5/2006 | |
| DE | 202005020629 U1 | * | 6/2006 | ........... B60K 17/303 |
| DE | 102006041896 A1 | | 4/2008 | |
| DE | 102006061770 A1 | | 7/2008 | |
| DE | 102017208101 A1 | * | 11/2018 | ........... B60G 17/019 |
| EP | 1304279 A1 | | 4/2003 | |
| EP | 1634754 A1 | | 3/2006 | |
| EP | 1747930 A1 | * | 1/2007 | ........... B60K 7/0007 |
| EP | 1747969 A1 | * | 1/2007 | ........... B60K 7/0007 |
| EP | 1795432 A1 | * | 6/2007 | ........... B60K 17/303 |
| EP | 3241719 A2 | * | 11/2017 | ............. B62D 5/001 |
| FR | 2986749 A1 | | 8/2013 | |
| JP | 2018-058484 A | | 4/2018 | |
| WO | WO-2007036314 A1 | * | 4/2007 | ........... B60K 17/303 |
| WO | WO-2021162441 A1 | * | 8/2021 | |

OTHER PUBLICATIONS

Feb. 17, 2021 Search Report issued in European Patent Application No. 20197134.8.

* cited by examiner

*Primary Examiner* — Paul N Dickson
*Assistant Examiner* — Maxwell L Meshaka
(74) *Attorney, Agent, or Firm* — Oliff PLC

(57) ABSTRACT

A turning device includes: a motor configured to generate a drive force for independently steering a steered wheel; a speed reducer connected to a rotary shaft body of the motor; and a brake configured to suppress transfer of torque between the motor and the speed reducer.

5 Claims, 4 Drawing Sheets

TURNING DEVICE

CROSS-REFERENCE TO RELATED APPLICATION

This application claims priority to Japanese Patent Application No. 2019-173094 filed on Sep. 24, 2019, incorporated herein by reference in its entirety.

BACKGROUND

1. Technical Field

The present disclosure relates to a turning device that independently steers steered wheels of a vehicle.

2. Description of Related Art

There has hitherto been a so-called steer-by-wire system, as a steering system for an automobile, in which steered wheels are steered based on information that indicates a steering angle with no mechanism that mechanically connects between a steering wheel and the steered wheels or with no mechanism that mechanically transfers torque between the steering wheel and the steered wheels. There are also proposed a steer-by-wire system in which right and left steered wheels are connected to each other by a mechanical link, and a steer-by-wire system of a right-left independent steering type in which right and left steered wheels are steered by separate motors with no mechanical link interposed between the right and left steered wheels as described in Japanese Unexamined Patent Application Publication No. 2018-58484 (JP 2018-58484 A).

SUMMARY

In the case where the steered wheels are independently steered using a motor as a drive source, the steered wheels are steered with output torque from the motor increased by a speed reducer. Depending on the condition of a road surface on which the vehicle is traveling, the steering condition, etc., a so-called reverse input, which is torque input from the steered wheels to the speed reducer, may be caused.

The present disclosure provides a turning device in which a speed reducer is protected from a reverse input from steered wheels.

An aspect of the present disclosure provides a turning device including: a motor configured to generate a drive force for independently steering a steered wheel; a speed reducer connected to a rotary shaft body of the motor; and a brake configured to suppress transfer of torque between the motor and the speed reducer.

With the configuration described above, it is possible to provide a turning device in which damage to a speed reducer can be avoided by suppressing rotation of a motor using a brake even in the case where a reverse input is caused.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A turning device according to an embodiment of the present disclosure will be described below with reference to the drawings. The numerical values, shapes, materials, constituent elements, positional relationship among the constituent elements, state of connection, steps, order of the steps, etc. are exemplary, and are not intended to limit the present disclosure. A plurality of disclosures may be described in relation to one embodiment below. Constituent elements not described in a claim are described as optional for the disclosure according to the claim. The drawings are schematic diagrams that include exaggeration, omission, and scale adjustment, as appropriate, in order to illustrate the present disclosure, and may be different from the actual shapes, positional relationship, or scale.

Figure 1:
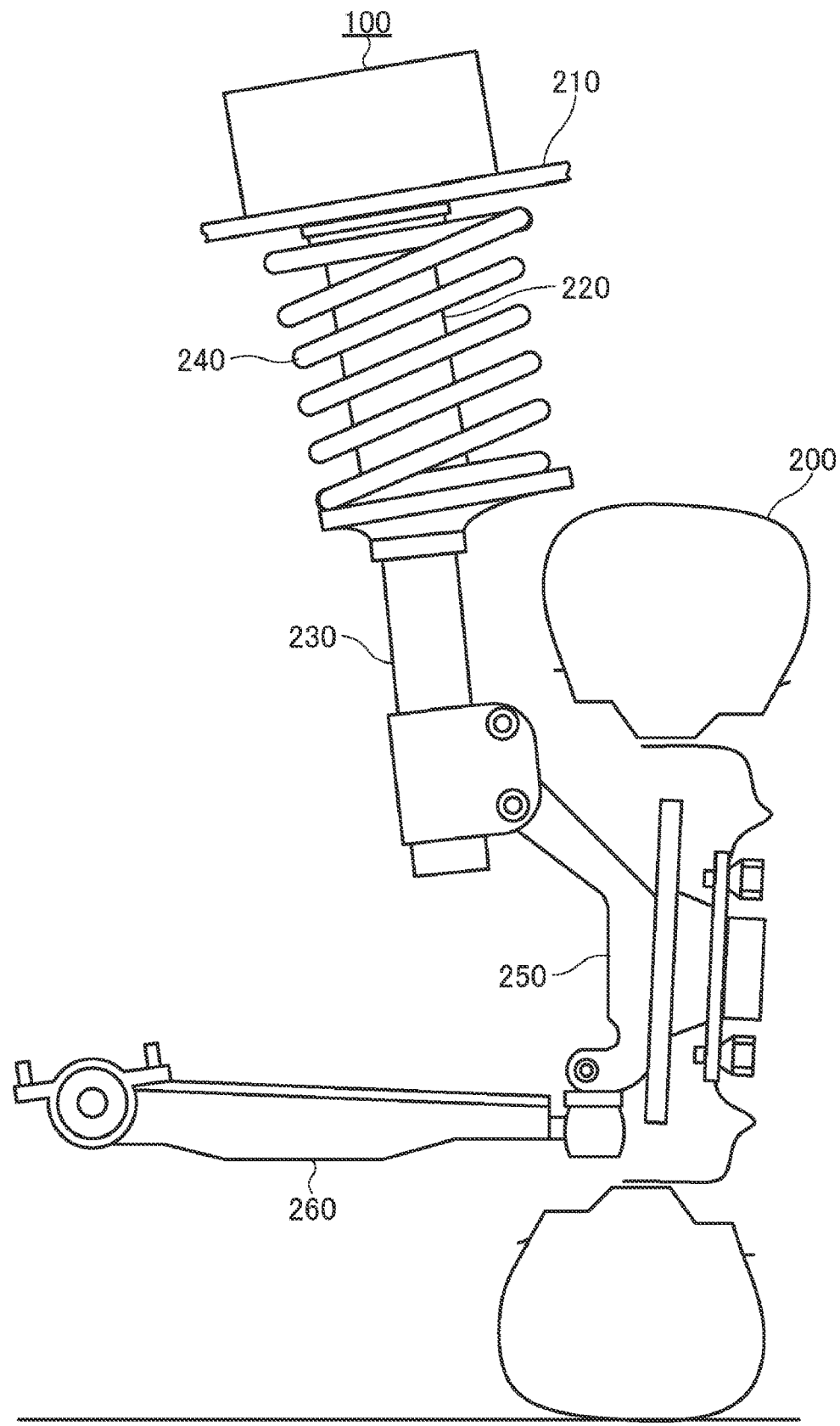
FIG. 1 illustrates a turning device, a suspension mechanism, and a steered wheel according to an embodiment.

FIG. 1 illustrates a steered wheel and a suspension. A turning device 100 is a device that can independently steer a plurality of steered wheels 200. In the case of the present embodiment, the turning device 100 steers the steered wheel 200 via a suspension mechanism, for example. FIG. 1 illustrates a suspension mechanism of a strut type which is one type of suspension mechanisms. The turning device 100 is disposed between the strut suspension mechanism and a vehicle body 210 such as a tire house, and steers the steered wheel 200 by turning the steered wheel 200 about a strut shaft 230 together with a shock absorber 220 and a spring 240. The strut suspension mechanism further includes a knuckle 250 attached to the steered wheel 200, a lower arm 260 coupled to the lower portion of the knuckle 250, an articulated member that connects the parts so as to enable articulated operation, etc.

Figure 2:
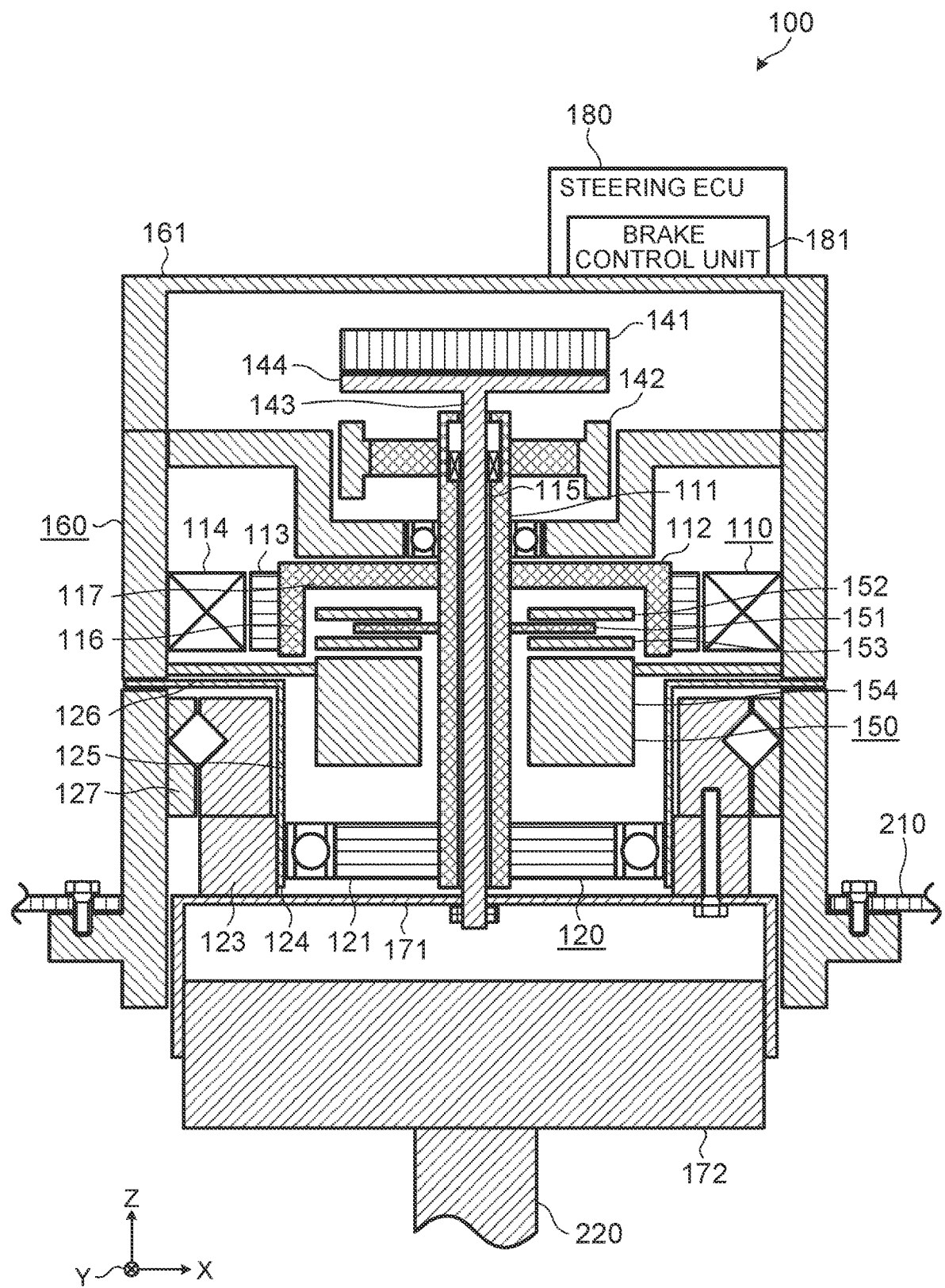
FIG. 2 is a sectional view illustrating the turning device according to the embodiment.

FIG. 2 is a sectional view illustrating the internal structure of the turning device 100. As illustrated in the drawing, the turning device 100 includes a motor 110, a speed reducer 120, and a brake 150. In the case of the present embodiment, the turning device 100 includes a first rotation sensor 141, a second rotation sensor 142, and a brake control unit 181.

The motor 110 is a drive source that generates a drive force for steering the steered wheel 200. In the case of the present embodiment, the motor 110 is a servo motor that includes a rotary shaft body 111, a rotor 112, magnets 113, and coils 114.

The rotary shaft body 111 is a bar-like rigid body that outputs the rotational drive force of the motor 110. The rotary shaft body 111 is a member having a length longer than the lengths of the rotor 112, the magnets 113, and the coils 114 in the axial direction (Z-axis direction in the drawing). Specifically, the rotary shaft body 111 extends from the vicinity of an output-side member 171 connected to an external gear 124 (to be discussed later) of the speed reducer 120, and penetrates the center portion of a wave generator 121 and the brake 150. In the case of the present embodiment, the rotary shaft body 111 has a pipe shape penetrated by a hollow portion 115 in the axial direction.

The rotor 112 is a member that transfers torque generated between the magnets 113 and the coils 114 to the rotary shaft body 111. The shape of the rotor 112 is not specifically limited. In the case of the present embodiment, the rotor 112 includes a holding portion 116 having a short cylindrical shape that holds the magnets 113, and a connection portion 117 that connects between the holding portion 116 and the outer peripheral surface of the rotary shaft body 111. The holding portion 116 is disposed coaxially with the rotary shaft body 111. The connection portion 117 is integrally attached to one end portion of the holding portion 116 in the axial direction. The rotor 112 has a container shape. At least a part of the brake 150 for braking the rotary shaft body 111 is housed in the rotor 112. Consequently, the length of the turning device 100 in the axial direction can be suppressed.

The magnets 113 are members that generate torque that rotates the rotary shaft body 111 through interaction with a magnetic force generated by the coils 114, and are attached to the outer peripheral surface of the holding portion 116 of the rotor 112 side by side with each other in the circumferential direction. The magnets 113 are disposed such that N poles and S poles thereof are arranged in a predetermined pattern.

The coils 114 are members obtained by winding a conductive wire material that constitutes an electromagnet that generates a magnetic field that acts on the magnets 113. The directions of the winding axes of the coils 114 extend along the radial directions about the axis of the rotary shaft body 111. The coils 114 are disposed slightly on the outer side from a region in which the magnets 113 rotate, and disposed side by side in the circumferential direction so as to surround the magnets 113. The coils 114 are fixed to the inner peripheral surface of a housing 160 having a cylindrical shape. The coils 114 may include a core that concentrates the magnetic field.

The speed reducer 120 is a device connected to the rotary shaft body 111 of the motor 110 to amplify rotational torque generated by the motor 110 to rotational torque that can steer the steered wheel 200. The type of the speed reducer 120 is not specifically limited. In the case of the present embodiment, a wave speed reducer in which input and output shafts are coaxial is adopted as the speed reducer 120. The wave speed reducer includes a rigid cylindrical internal gear 123, the external gear 124 which has external teeth meshed with internal teeth of the internal gear 123 and which is tubular and flexible in the radial direction, and the wave generator 121 which is elliptical and which deforms the external gear 124 into an elliptical shape with respect to the internal gear 123 to mesh the two gears with each other at a plurality of locations and circulates the meshing positions along the internal gear 123.

In the case of the present embodiment, the external gear 124 is a so-called silk hat type, and includes a cylindrical portion 125, at one end portion of which external teeth are formed, and a flange portion 126 that projects radially outward at the other end portion of the cylindrical portion 125. The flange portion 126 is disposed on the input side with respect to the external teeth. The outer peripheral end portion of the flange portion 126 is fixed to the housing 160, to which the coils 114 are fixed. By disposing the external gear 124 in this manner, a first bearing 127 such as a cross roller bearing that fixes the internal gear 123 such that the internal gear 123 is rotatable with respect to the housing 160 can be disposed on the outer side with respect to the cylindrical portion 125 between the external teeth and the flange portion 126, and a part of the brake 150 etc. can be disposed on the inner side of the cylindrical portion 125. Thus, the length of the turning device 100 in the axial direction can be suppressed.

The wave generator 121 is coaxially penetrated by the rotary shaft body 111, and directly receives rotational torque from the rotary shaft body 111. In addition, the rotational axis of the wave generator 121 is determined by the rotary shaft body 111.

The internal gear 123 is fixed to the housing 160 via the first bearing 127 so as to be rotatable with respect to the housing 160, and functions as a member on the output side. The coils 114 are fixed to the housing 160. The output-side member 171 is fixed to the internal gear 123 so as to cover the output side. In addition, a universal joint 172 is attached to the output-side member 171. The internal gear 123 is connected to the strut shaft 230 of the suspension mechanism via the output-side member 171 and the universal joint 172, and outputs rotational torque for steering the steered wheel 200.

The brake 150 is a device that suppresses transfer of torque between the motor 110 and the speed reducer 120. Specifically, the brake 150 can suppress and stop rotation of the rotary shaft body 111 which is an output shaft body of the motor 110 through friction. In the case of the present embodiment, the brake 150 is of a non-energized actuation type that engages braking when not energized and that disengages braking when energized, and is disposed between the motor 110 and the speed reducer 120. Specifically, the brake 150 is of a non-excited actuation type, operation of which is controlled by an electromagnet 155 (see FIG. 3) and a biasing member (not illustrated), and includes a brake disc 151, a brake pad 152, an armature 153, and operation means 154.

The brake disc 151 is an annular member with a rectangular sectional surface securely attached to the rotary shaft body 111 to project in the radial direction of the rotary shaft body 111. The brake disc 151 is a member that rotates together with the rotary shaft body 111, and that is clamped between the brake pad 152 and the armature 153 to generate torque in the direction opposite to that of rotation of the rotary shaft body 111 through friction.

The brake pad 152 is a member disposed on the opposite side of the brake disc 151 from the operation means 154 and fixed to the operation means 154. The brake pad 152 is an annular member with a rectangular sectional surface. The brake pad 152 is disposed to extend in the radial direction of the rotary shaft body 111 so as to surround the rotary shaft body 111, and is disposed in parallel with the brake disc 151.

The armature 153 is a member disposed on the opposite side of the brake disc 151 from the brake pad 152, and configured to move in the direction of clamping the brake disc 151 together with the brake pad 152 by a biasing force of a biasing member of the operation means 154, and to move in the direction of approaching the operation means 154 against the biasing force of the biasing member in the case where the electromagnet 155 of the operation means 154 is excited. The armature 153 is an annular member with a rectangular sectional surface. The armature 153 is disposed to extend in the radial direction of the rotary shaft body 111 so as to surround the rotary shaft body 111, and is disposed in parallel with the brake disc 151.

The operation means 154 is a cylindrical member fixed to the housing 160, and includes the biasing member which reciprocally moves the armature 153 in the axial direction of the rotary shaft body 111, and the electromagnet 155. Examples of the biasing member include coil springs. The operation means 154 includes a plurality of coil springs arranged in the circumferential direction.

The first rotation sensor 141 is a sensor that detects the rotational angle on the output side of the speed reducer 120. The type of the first rotation sensor 141 is not specifically limited. The first rotation sensor 141 may be an optical rotary encoder. In the case of the present embodiment, the first rotation sensor 141 includes a detection shaft body 143. One end portion of the detection shaft body 143 penetrates the wave generator 121 of the speed reducer 120, and is connected to the rotational center of the output-side member 171 on the output side of the speed reducer 120. In addition, the detection shaft body 143 penetrates the hollow portion 115 of the rotary shaft body 111. The other end portion of the detection shaft body 143 projects from the rotary shaft body 111. The first rotation sensor 141 detects the rotational angle on the output side of the speed reducer 120 based on rotation of the detection shaft body 143 on the input side of the speed reducer 120 and on the opposite side of the motor 110 from the speed reducer 120, by detecting the rotational angle of a disk portion 144 provided at the other end portion of the rotary shaft body 111. The first rotation sensor 141 is disposed farther from the speed reducer 120 than the brake 150 and the second rotation sensor 142.

As described above, by disposing the first rotation sensor 141 at a position farther from the speed reducer 120 than the motor 110 using the detection shaft body 143, a plurality of rotation sensors can be concentrated at one location, which facilitates implementing dust suppression measures etc. for the rotation sensors. In addition, output signals from the rotation sensors can be concentrated at one location to be led out of the housing 160, which facilitates handling of signal wires outside the housing 160. Further, handling of electric wires can be facilitated by concentrating electric wires for power supply to the motor 110 and power lines for the brake 150 at the same position as the signal wires and leading the wires out of the housing 160. Use of a connector (not illustrated) that penetrates the housing 160 facilitates connection to and disconnection from electric wires outside the housing 160, and also enables dust suppression.

The second rotation sensor 142 is a sensor attached to the rotary shaft body 111 of the motor 110 to detect the rotational angle of the motor 110. The type of the second rotation sensor 142 is not specifically limited. In the case of the present embodiment, a resolver is adopted as the second rotation sensor 142. A resolver can accurately sense the rotational angle of the rotary shaft body 111 which rotates at a high speed.

As described above, by acquiring the rotational angle on the output side using the first rotation sensor 141 and acquiring the rotational angle on the input side using the second rotation sensor 142, the second rotation sensor 142 can be calibrated using information based on the first rotation sensor 141 in the case where information based on the second rotation sensor 142 is not in a predetermined relationship with respect to the information based on the first rotation sensor 141.

The housing 160 is a box-shaped member that houses the motor 110, the brake 150, at least the input side of the speed reducer 120, the second rotation sensor 142, and the first rotation sensor 141 sequentially in this order. The shape of the housing 160 is not specifically limited. In the case of the present embodiment, the housing 160 has a cylindrical shape, and a portion of the housing 160 in the vicinity of the first rotation sensor 141 is closed by a lid member 161. The housing 160 is fixed to the vehicle body 210 such that the motor 110, the brake 150, at least the input side of the speed reducer 120, the second rotation sensor 142, and the first rotation sensor 141 are disposed on the outer side with respect to a portion of the vehicle body 210 that forms a so-called tire house that houses the steered wheel 200 and the suspension mechanism. In the case of the present embodiment, the housing 160 also houses the internal gear 123 disposed on the output side of the speed reducer 120 and a part of the output-side member 171, and the internal gear 123 is disposed on the outer side with respect to the vehicle body 210. While the housing 160 is attached so as to project outward from the vehicle body 210, the housing 160 is not exposed to the outside to be visually recognizable since the housing 160 is covered by a hood of the vehicle.

As described above, in the turning device 100 according to the present embodiment, the brake 150 is connected between the motor 110 and the speed reducer 120. Thus, rotational torque or the moment of inertia of the motor 110 before being input to the speed reducer 120 can be resisted, and damage to the turning device 100 due to the occurrence of a reverse input can be suppressed.

Torque is suppressed against rotational torque or the moment of inertia of the motor 110 before being amplified by the speed reducer 120, and therefore torque to be generated through friction can be set to be low. Thus, a small brake 150 can be adopted, and the size, in particular the thickness in the axial direction, of the turning device 100 can be reduced.

By sensing the rotational angle on the output side of the speed reducer 120 with the first rotation sensor 141, which is disposed at a position on the input side, using the detection shaft body 143, the length of the turning device 100 in the axial direction can be shortened compared to the case where a rotational angle sensor is provided on the output side of the speed reducer 120.

A high dust suppression performance can be obtained, since the motor 110, the brake 150, the speed reducer 120, the first rotation sensor 141, and the second rotation sensor 142 are housed in the housing 160 which is attached to the vehicle body 210 and which is disposed above the vehicle body 210 which defines the tire house in which the steered wheel 200 is disposed.

A harness can be handled easily, since electric wires for exchange of electric signals and power between the inside and the outside of the housing 160 can be concentrated at one location.

By adopting a brake of the non-energized actuation type, turning of the steered wheels 200 can be regulated by the brake 150 fixing the rotary shaft body 111 in the case where no power is supplied to the turning device 100 such as while the vehicle is stationary.

The brake control unit 181 generates torque that resists rotation of the rotary shaft body 111 by actuating the brake 150 in the case where it is determined based on information from the first rotation sensor 141 that the behavior of the steered wheels 200 is abnormal. Examples of the state in which the behavior of the steered wheels 200 is abnormal include a case where the steered wheels 200 are turned into an unintended direction when the steered wheel 200 contacts a curb with the vehicle skidding during travel.

Figure 3:
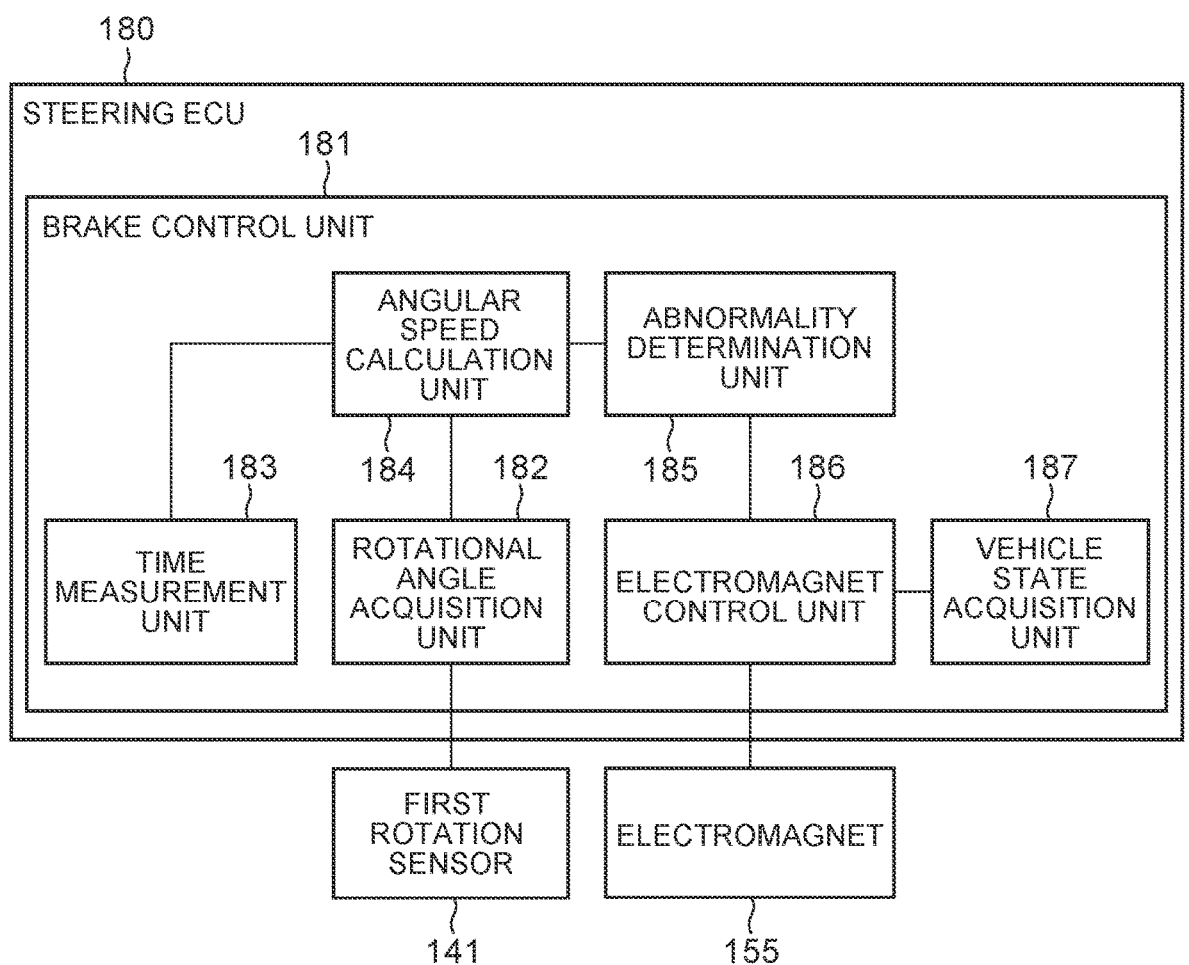
FIG. 3 is a block diagram illustrating the functional configuration of a brake control unit according to the embodiment.

FIG. 3 is a block diagram illustrating the functions of the brake control unit 181. As illustrated in the drawing, the brake control unit 181 is a part of a steering electronic control unit (ECU) 180, and includes a rotational angle acquisition unit 182, a time measurement unit 183, an angular speed calculation unit 184, an abnormality determination unit 185, an electromagnet control unit 186, and a vehicle state acquisition unit 187.

The rotational angle acquisition unit 182 is a processing unit that acquires a rotational angle from the first rotation sensor 141. Specifically, the rotational angle acquisition unit 182 may only count the number of pulse signals from the first rotation sensor 141, and calculate a rotational angle from the number of the pulses.

The time measurement unit 183 is a processing unit that measures a time. The time measurement method of the time measurement unit 183 is not specifically limited, and the time measurement unit 183 may measure a time based on the sampling period of the brake control unit 181, for example. For example, one sampling period may be determined as time 1. Alternatively, the number of sampling periods may be multiplied by the sampling period to calculate the actual time.

The angular speed calculation unit 184 calculates an angular speed based on the rotational angle which is obtained from the rotational angle acquisition unit 182 and the time which is obtained from the time measurement unit 183. Specifically, the angular speed calculation unit 184 may determine the difference in the rotational angle for one sampling period of the brake control unit 181 as the number of pulses obtained from the first rotation sensor 141, and acquire this value as the angular speed. Also in this case, the angular speed is calculated by dividing the rotational angle by the time which is obtained from the time measurement unit 183.

The abnormality determination unit 185 determines an abnormality by estimating that a reverse input is caused in the case where the angular speed which is obtained from the angular speed calculation unit 184 is equal to or more than a predetermined angular speed threshold.

The electromagnet control unit 186 applies brake torque to the rotary shaft body 111 by controlling the electromagnet 155 of the brake 150 in the case where the abnormality determination unit 185 outputs a signal that indicates an abnormality. In the case of the present embodiment, the brake 150 is of a non-excited actuation type, and therefore applies brake torque to the rotary shaft body 111 by the electromagnet control unit 186 blocking power supply to the electromagnet 155.

With the above configuration, it is possible to suppress inertia torque of the motor 110 by braking the rotary shaft body 111 when a reverse input is caused. Thus, damage to the speed reducer 120 due to the reverse input from the output side and the inertia torque from the input side can be suppressed.

The vehicle state acquisition unit 187 acquires the state of the vehicle to which the steered wheels 200 are attached, e.g. whether the vehicle is traveling or stationary, from a higher-level ECU such as the steering ECU, and controls the brake 150 in accordance with the state of the vehicle. In the case of the present embodiment, the vehicle state acquisition unit 187 outputs a signal to cause the electromagnet control unit 186 to block power supply to the electromagnet 155 in the case where information indicating that the vehicle is parked is acquired. Consequently, it is possible to suppress the steered wheels 200 from being steered also in the case where the vehicle is rear-ended while the vehicle is stationary or the like.

The present disclosure is not limited to the embodiment described above. For example, the constituent elements described herein may be combined as desired, or some of the constituent elements may be excluded, to implement different embodiments of the present disclosure. In addition, the present disclosure also includes modifications obtained by a person skilled in the art making various conceivable changes to the embodiment described above without departing from the scope and spirit of the present disclosure, that is, the meaning of the language used in the claims.

For example, while the turning device 100 according to the embodiment described above is described as a device that steers the steered wheel 200 via a suspension mechanism including the shock absorber 220 and the strut shaft 230, the turning device 100 may steer the steered wheel 200 via a suspension mechanism of a different type, or may steer the steered wheel 200 via a steering operation mechanism separately from the suspension mechanism.

A wave gear mechanism is described as an example of the speed reducer 120 in which an input shaft and an output shaft are disposed coaxially. However, the speed reducer 120 is not limited thereto, and the speed reducer 120 may utilize a planetary gear mechanism, for example.

Figure 4:
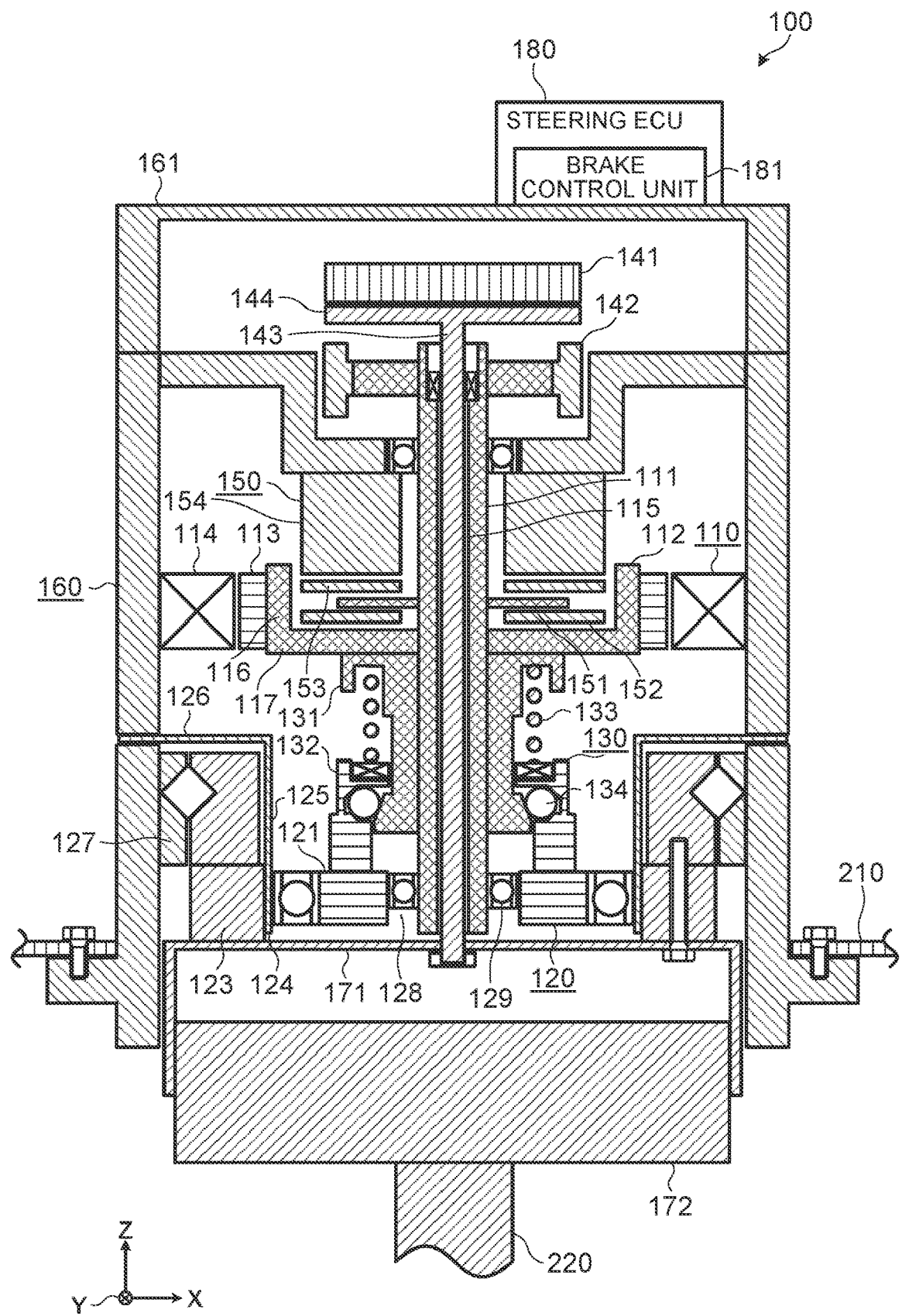
FIG. 4 is a sectional view illustrating another example of the turning device.

As illustrated in FIG. 4, the turning device 100 may include an overload protection device 130. The overload protection device 130 is a so-called torque limiter that blocks transfer of torque between the motor 110 and the speed reducer 120 in the case where an overload occurs. The overload protection device 130 includes: a first member 131 disposed coaxially with the rotary shaft body 111 and fixed to the outer peripheral surface of the rotary shaft body 111; a second member 132 attached to the outer peripheral edge portion of a through hole 128 of the wave generator 121 on the input side of the speed reducer 120; a biasing member 133 that biases the second member 132 against the first member 131; and spherical engagement members 134 disposed between the first member 131 and the second member 132 and strongly engaged with the first member 131 and the second member 132 when the second member 132 is pressed against the first member 131 by the biasing member 133.

In the overload protection device 130, normally, the first member 131 and the second member 132 are strongly coupled to each other via the engagement members 134 by the biasing force of the biasing member 133, and therefore rotational torque of the rotary shaft body 111 is transferred to the wave generator 121 of the speed reducer 120. On the other hand, in the case where an abrupt reverse input is caused such as when the steered wheel 200 is hit by a curb, and in the case where rotational torque of the reverse input from the strut shaft 230 which has been weakened via the speed reducer 120 excels the biasing force of the biasing member 133, the second member 132 idles with respect to the first member 131, and the reverse input is not transmitted to the first member 131, the rotary shaft body 111, etc.

The overload protection device 130 is disposed on the input side of the speed reducer 120, and therefore operates on rotational torque of a reverse input that has been reduced by the speed reducer 120. That is, a threshold value for rotational torque at which the overload protection device 130 idles can be reduced, and a small overload protection device 130 can be adopted. Thus, the overall size of the turning device 100 can be suppressed.

As illustrated in FIG. 4, the brake 150 may be disposed on the opposite side of the motor 110 from the speed reducer 120. The brake 150 protects the speed reducer 120 by suppressing inertia torque of the motor 110 in a state before the overload protection device 130 idles. The brake 150 can also protect the overload protection device 130 by reducing the number of times when the overload protection device 130 idles.

A part or all of the turning device 100 may be disposed inside the tire house.

The present disclosure is applicable to vehicles etc. in which steered wheels are steered independently, such as automobiles, construction machines, and agricultural machines.

What is claimed is:

1. A turning device comprising:
   a motor configured to generate a drive force for independently steering a steered wheel;

a speed reducer connected to a rotary shaft body of the motor; and a brake configured to suppress transfer of torque between the motor and the speed reducer.

2. The turning device according to claim 1, further comprising:

a first rotation sensor configured to detect a rotational angle on an output side of the speed reducer; and a steering electronic control unit configured to actuate the brake in a case where a behavior of the steered wheel is abnormal based on information from the first rotation sensor.

3. The turning device according to claim 2, wherein the steering electronic control unit is configured to measure a time, configured to determine an abnormality in the behavior of the steered wheel based on the rotational angle which is obtained from the first rotation sensor and an angular speed calculated in accordance with the measured time, and configured to actuate the brake in a case where in the behavior of the steered wheel is determined as abnormal.

4. The turning device according to claim 2, wherein the steering electronic control unit is configured to actuate the brake in a case where a vehicle to which the steered wheel is attached is stationary.

5. The turning device according to claim 1, wherein the brake is a non-energized actuated brake configured to stop rotation of the rotary shaft body of the motor through friction when the brake is not energized.

* * * * *